United States Patent
Merlo

(10) Patent No.: US 7,182,164 B2
(45) Date of Patent: Feb. 27, 2007

(54) COOLING EQUIPMENT FOR A MOTOR VEHICLE, IN PARTICULAR FOR AN EXCAVATOR

(75) Inventor: Alessio Merlo, Brandizzo (IT)

(73) Assignee: CNH America LLC, New Holland, PA (US)

(*) Notice: Subject to any disclaimer, the term of this patent is extended or adjusted under 35 U.S.C. 154(b) by 501 days.

(21) Appl. No.: 10/634,939

(22) Filed: Aug. 5, 2003

(65) Prior Publication Data

US 2004/0063396 A1  Apr. 1, 2004

(30) Foreign Application Priority Data

Aug. 14, 2002 (IT) .......................... TO2002A0727

(51) Int. Cl.
*B60K 11/06* (2006.01)
(52) U.S. Cl. .................................... 180/68.1; 180/68.4
(58) Field of Classification Search ............... 180/68.1, 180/68.2, 68.3, 68.4, 68.5
See application file for complete search history.

(56) References Cited

U.S. PATENT DOCUMENTS

| | | | | |
|---|---|---|---|---|
| 3,788,418 A | * | 1/1974 | Clancy et al. ............. | 180/68.4 |
| 5,791,301 A | * | 8/1998 | Watanabe ................. | 123/41.31 |
| 5,816,351 A | * | 10/1998 | Akira et al. ............... | 180/68.1 |
| 6,032,620 A | * | 3/2000 | Tsukiana et al. .......... | 123/41.48 |
| 6,192,839 B1 | * | 2/2001 | Takeshita et al. ......... | 123/41.49 |
| 6,390,770 B1 | * | 5/2002 | Takeshita .................... | 415/119 |
| 6,431,299 B1 | * | 8/2002 | Asche et al. ............... | 180/68.1 |
| 6,540,036 B1 | * | 4/2003 | Sugano ....................... | 180/68.1 |
| 6,622,668 B2 | * | 9/2003 | Izumi ....................... | 123/41.49 |
| 6,745,860 B2 | * | 6/2004 | Yabe .......................... | 180/68.1 |
| 6,901,903 B2 | * | 6/2005 | Nakajima et al. ....... | 123/198 E |
| 6,922,925 B2 | * | 8/2005 | Watanabe et al. ............. | 37/466 |
| 2004/0173395 A1 | * | 9/2004 | Arai et al. ................. | 180/68.1 |

* cited by examiner

*Primary Examiner*—Jeff Restifo
(74) *Attorney, Agent, or Firm*—Stephen A. Bucchianeri; John William Stader; Michael G. Harms

(57) ABSTRACT

Cooling equipment for an excavator, in which a longitudinal axis of a first portion of a delivery duct is substantially parallel to the axis of the excavator, while a longitudinal axis of a second portion of the delivery duct is substantially transverse with respect to the longitudinal axis.

10 Claims, 2 Drawing Sheets

COOLING EQUIPMENT FOR A MOTOR VEHICLE, IN PARTICULAR FOR AN EXCAVATOR

BACKGROUND OF THE INVENTION

1. Field of Art

The present invention relates to cooling equipment for an excavator.

2. Description of Prior Art

As known in the art, an excavator is provided, among other things, with cooling equipment designed for lowering the temperature of one or more coolant liquids set in circulation to and from the mechanical members that generate thermal energy.

Such cooling equipment comprises, in general, an air intake, an air-delivery duct to one or more devices (such as radiators) for the cooling of fluids (coolant water, air, hydraulic oil, etc.), and a fan operable to send a flow of ambient air from the air intake towards the cooling devices, through the delivery duct, for providing the desired cooling on the fluids.

As an example, in the past, a first solution has been proposed, in which the air intake is located laterally on the bonnet of the excavator. In this case, the radiator is set directly facing the air intake.

The major advantage of this solution is essentially the fact that the dimensions of the radiator are not linked to other dimensional characteristics of the excavator (such as the width thereof in a direction transverse to the direction of movement), so that the manufacturer can decide, with a certain degree of freedom, the overall dimensions of the excavator itself. In addition, the above configuration results in a lower noise level of the cooling system as observed in the cab of the vehicle, since the noise is emitted in a lateral direction, away from the cab.

On the other hand, the drawbacks of this first solution of the prior art are due fundamentally to the fact that the flow of air, under conditions when the excavator is moving, is directed parallel to the face of the radiator. As a result, there is not an optimal use of the motion of the motor vehicle itself for a complementary cooling of the radiator; a complementary cooling which is otherwise to be added to the cooling obtained by means of the forced flow of air generated by the fan. This is all the worse since a moving excavator requires a power which is clearly higher than the power required under normal stationary working conditions, above all when it involves an excavator mounted on wheels and not on tracks.

Some calculations, which are backed up by corresponding experiments, have indicated that the operations of stationary digging with the excavator require only approximately 70% of the power that is necessary when the same excavator is moving. This means that, as has been mentioned, during movement, the radiator is required to dissipate more heat than is necessary under stationary working conditions.

Consequently, with the first solution previously illustrated, in critical conditions it is necessary to increase the speed of the fan. However, such an increase is possible only up to a certain limit, since there are constraints due to the maximum operating speed of the engine to which the fan is connected and to the coupling between the engine shaft and the fan shaft. Alternatively, it would be possible to open the bonnet in front of the radiator so as to allow unobstructed passage of air and thus to increase the air flow for cooling purposes. However, opening of the bonnet is not desirable because in this way the noise produced by the cooling equipment increases considerably. Moreover, this would result in an increase of the amount of dust that would deposit on the outer surface of the radiator itself, with readily imaginable undesirable effects.

Conversely, in a second known solution, the air intakes are set on the front part of the vehicle bodywork, oriented in the direction of normal travel. Also in this case the radiator is set facing the air intakes.

This second solution has the evident advantage that, in the conditions in which the excavator requires maximum dissipation of thermal energy, i.e., when the excavator is moving, this dissipation is facilitated by the motion of the vehicle itself.

However, in this second embodiment of the known art, the radiator is located very close to the cab in which the driver sits, and moreover it receives the flow of air hit-on, which further increases the noise level. Furthermore, since both the air intakes and the radiator are located alongside the arm of the excavator, when the latter is in working conditions, there is consequently an increase in the deposit of dust on the outer surface of the radiator. This results in a layer of dust which considerably reduces heat exchange between the forced flow of air and the liquid passing through the radiator.

The purpose of the present invention is therefore to provide cooling equipment for motor vehicles, in particular for excavators, that are exempt from the drawbacks described above.

Consequently, according to the present invention cooling equipment is provided for motor vehicles according to the characteristics claimed in claim 1.

SUMMARY OF THE INVENTION

Cooling equipment for an excavator, in which a longitudinal axis of a first portion of a delivery duct is substantially parallel to the axis of the excavator, while a longitudinal axis of a second portion of the delivery duct is substantially transverse with respect to the longitudinal axis.

BRIEF DESCRIPTION OF THE DRAWINGS

The present invention will now be described further, by way of example, with reference to the accompanying drawings.

DETAILED DESCRIPTION OF THE INVENTION

Figure 1:
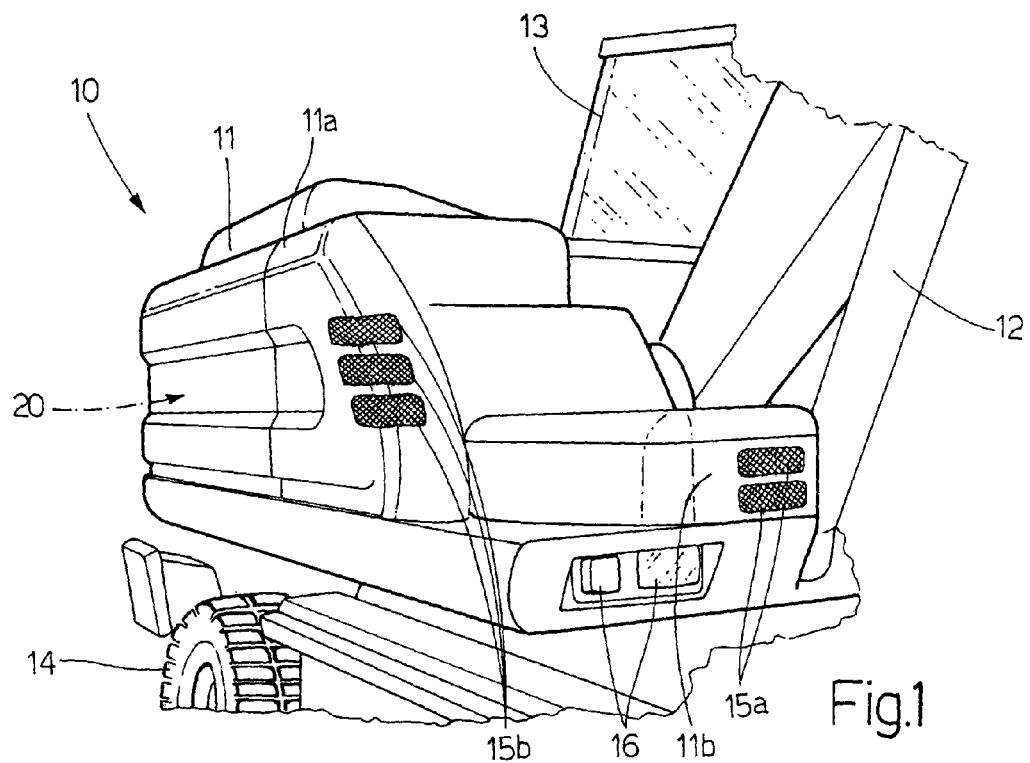
FIG. 1 illustrates a portion of the bodywork of an excavator, showing the air intakes and the place in which the rest of the cooling equipment forming the subject of the present invention is located.

It is to be noted that, with reference to the attached figures, only the items that are useful for a clear understanding of the present invention will be numbered and described in detail.

In the attached drawings, the reference number 10 designates, as a whole, a motor vehicle (in particular an excavator), on which the cooling equipment 20 that forms the subject of the present invention is mounted. The excavator 10 presents an axis of longitudinal symmetry (a) (FIG. 4), which identifies two preferential directions of movement (forward and backward movement), represented schematically in FIG. 4 by a double-headed arrow F.

The excavator 10 comprises, in a known manner, a bodywork 11 (FIG. 1), comprising a front hydraulic arm 12 and a cab 13 designed to accommodate an operator (not illustrated). The bodywork 11 is mounted on a chassis (not illustrated), to which there are associated two axles (not illustrated), each comprising a corresponding pair of wheels 14 (only one wheel 14 is visible in FIG. 1).

The cooling equipment 20 is located in a portion 11a of the bodywork 11, which is positioned, in the present case, to the right of the operator, who is seated, as has been said, in the cab 13. The portion 11a of the bodywork 11 in turn comprises air intake openings 15a, 15b provided on the front part of the portion 11a.

Figure 4:
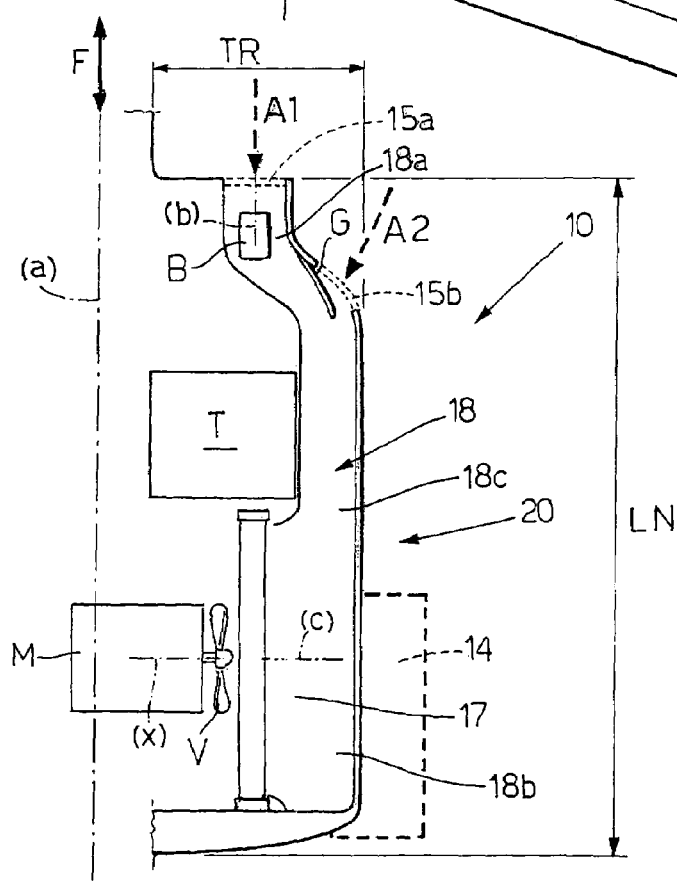
FIG. 4 shows a plan view of the portion of the excavator as illustrated in FIGS. 2 and 3.

Said particular arrangement of the openings 15a, 15b, as has been said, favors entrance of the coolant air, in the directions indicated by the arrows A1 and A2 as illustrated in FIG. 4, during motion of the excavator 10 in the forward direction. Alongside the air intake 15a, headlights 16 are provided in a known manner.

Figure 2:
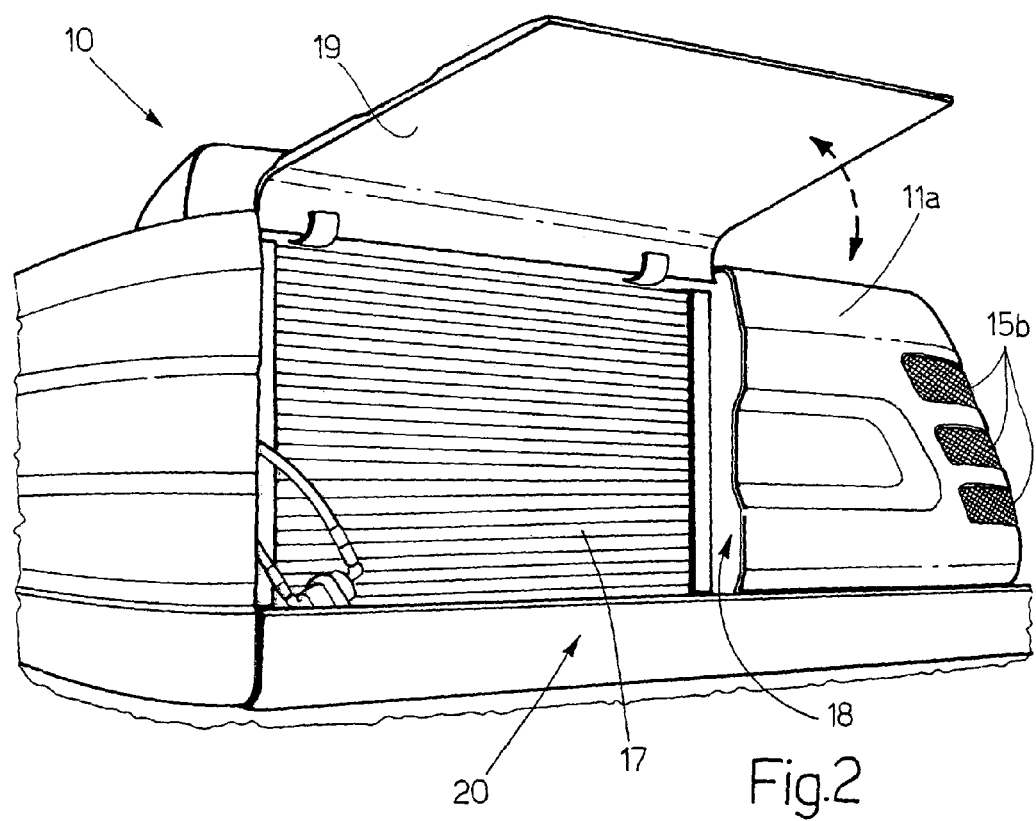
FIG. 2 illustrates a side of the bodywork of the excavator of FIG. 1, in which a removable side bonnet panel has been raised to disclose the radiator set inside the bodywork.
Figure 3:
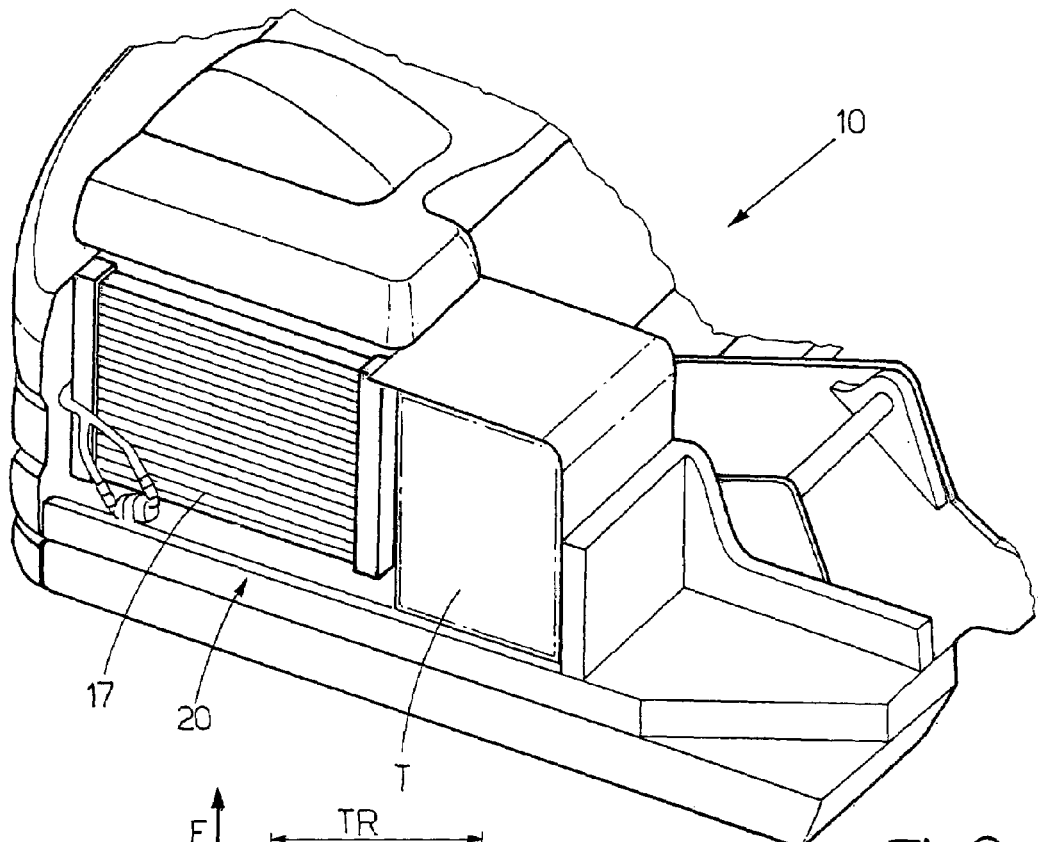
FIG. 3 illustrates the same side as the one represented in FIG. 2, in which the lateral bodywork has been removed completely to provide a clearer view of the details which form part of the equipment constituting the subject of the present invention.

With reference to FIGS. 2, 3 and 4, the part of the equipment 20 housed inside the portion 11a of the bodywork 11 comprises the aforementioned openings 15a, 15b (the air flows being in the directions indicated by the arrows A1 and A2) connected, in fluid-dynamic manner, to a radiator 17 by means of an air-delivery duct 18.

By way of partial covering of the opening 15b and in such a way as not to disturb the flow of air in the direction indicated by the arrow A2, a deflector G is provided for guiding the air coming from the opening 15a (arrow A1).

The radiator 17 is provided, in a conventional way, with a suction fan V for taking in the ambient air, said fan V being set in rotation about an axis X (FIG. 4) by the engine M of the excavator 10 in a known manner. In addition, the radiator 17 is connected hydraulically, in a usual manner, by means of tubes (not illustrated) for conveying the coolant liquid to the parts of the excavator 10 that need to be cooled.

With further reference to FIG. 4, the openings 15a, 15b are located in a position that is substantially perpendicular to the respective air flows defined by the arrows A1, A2 when the excavator 10 moves forward according to one of the two directions identified by the arrow F. The air-delivery duct 18, in particular, has a first stretch 18a, of which a longitudinal axis (b) is substantially parallel to the aforementioned axis of symmetry (a) of the excavator 10. A second stretch 18b of the duct 18 is set transverse to the radiator 17 and has an axis of longitudinal symmetry (c) which is substantially transverse with respect to the axis (a). The first stretch 18a and the second stretch 18b are connected physically to one another by a third stretch 18c, which substantially follows the outline of the portion 11a of the bodywork 11. In particular, as will be seen better in what follows, the duct 18, according to a preferred solution, uses the portion 11a of the bodywork 11 as an air guiding wall.

In other words, the cooling equipment 20 has at least one air intake 15a, 15b positioned in a manner so that it is substantially perpendicular to the respective air flows, defined by the arrows A1, A2, whereby air flow is forced there through as a result of the forward movement of the excavator 10, whilst the radiator 17 is positioned in a substantially tangential manner with respect to the air flows defined by the arrows A1, A2.

With this particular arrangement of the opening 15a and of the radiator 17, there is the advantage of having at least one air-intake opening 15a (or 15b) set in a favorable position with respect to the forward direction of movement of the excavator 10, without, however, having at the same time the drawback that the radiator 17 directly faces the opening 15a (or 15b). Consequently, with this solution the air is prevented from impinging directly upon the radiator 17 and in so doing, causing a troublesome noise. Moreover, any fouling of the surface of the radiator 17 with the dust raised by the wheels 14 and/or by the arm 12 is reduced or even prevented during operating conditions, due to the longer distance between the radiator and the air intake openings 15a, 15b.

Again with reference to FIG. 4, alongside the radiator 17, housed in a position upstream of the radiator 17 with respect to the direction of flow of the air inside the delivery duct 18, is a fuel tank T, the outer wall of which forms a portion of the delivery duct 18. Additionally, a battery B is set facing the opening 15a and is impinged upon directly by the flow of air defined by the arrow A1. In other words, the battery housing is part of the first stretch 18a.

Furthermore, as illustrated in FIGS. 1 and 3, the air intake 15a is situated on a front box-shaped element 11b (containing the aforementioned battery housing), which forms an integral part of the portion 11a of the bodywork 11. This front element 11b has the function of further silencing the entry of the air from the opening 15a.

Another advantageous element of the present invention is represented by the fact that, as illustrated in FIG. 2, the radiator 17 is covered by a pivotable side bonnet panel 19, which enables easy access to the radiator 17 and associated elements, without having to gain access to these elements by passing through the openings 15a, 15b. The removable side bonnet panel 19 furthermore forms a side wall of the air-delivery duct 18, more in particular, at the portion 18c. Although the panel 19 could have air-entry openings, it is preferred not to in order to further reduce noise transmission towards the environment. Moreover, air entering through openings in the panel 19 would disturb the laminar flow of air through the duct 18.

With reference to FIG. 4, with the solution proposed by the present invention, the dimensions of the radiator 17 are imposed not by the transverse dimension TR of the bodywork 11, but by the longitudinal dimension LN thereof. This represents a considerable advantage. In effect, whilst the transverse dimensions TR of the excavator 10 are imposed and limited by constructional requirements and an important part of the transverse side is occupied by the arm 12, the manufacturer has, instead, a certain degree of freedom in the choice of the overall longitudinal dimensions LN. Hence, he can choose a radiator 17 which is larger and designed such as to dissipate better and faster considerable amounts of heat produced by the excavator 10, above all in conditions that are more unfavorable from this point of view, i.e., in conditions of movement of the vehicle on wheels.

Although the radiator 17 is represented in the attached drawings as a single bloc element, it will be appreciated that in common practice a series of radiators (not illustrated) usually is provided for cooling the engine, for cooling the oil of the hydraulic system, for air conditioning, etc.

In this respect, the portion of the radiator 17 which is favored and thus receives the largest amount of coolant air, is the one which is located in the part thereof closest to the openings 15a and 15b. Consequently, the supplementary radiators (not illustrated) advantageously may be positioned preferably at the portion of the radiator 17 closest to the openings 15a and 15b.

What is claimed:

1. Cooling equipment for an excavator, having a longitudinal axis of symmetry identifying two directions of preferential movement; said equipment comprising at least one air intake, a duct for delivery of the air to a radiator for cooling of coolant liquids, and a fan operable to send a flow of incoming air from said at least one air intake to said radiator through said delivery duct for providing the desired cooling of the coolant liquid; wherein that said at least one air intake is positioned in a way substantially perpendicular to a flow of air drawn in during the forward movement of said excavator, wherein that said radiator is positioned in a manner substantially tangential to said flow of air; and further wherein a further air intake is provided in said delivery duct downstream of said at least one air intake; said further air intake being shielded from the air coming from said at least one air intake by a deflector.

2. Cooling equipment as described claim 1, wherein said delivery duct extends substantially in the longitudinal direction of the excavator.

3. Cooling equipment as described in claim 2, wherein said at least one air intake is positioned at a front portion of the excavator bodywork whereas the radiator is located at a rear portion thereof.

4. Cooling equipment as described in claim 3, wherein an outer, lateral side of said delivery duct is formed by a side bonnet panel of the excavator bodywork.

5. Cooling equipment for an excavator having a longitudinal axis of symmetry identifying two directions of preferential movement; said equipment comprising at least one air intake, a duct for delivery of the air to a radiator for cooling of coolant liquids, said radiator having a cooling face parallel to the longitudinal axis of symmetry, and a fan operable to send a flow of incoming air from said at least one air intake to said radiator, through said delivery duct, for providing the desired cooling of the coolant liquid; and wherein that said at least one air intake is positioned in a way substantially perpendicular to a flow of air drawn in during the forward movement of said excavator, and in that said radiator is positioned in a manner substantially tangential to said flow of air;

wherein said delivery duct extends substantially in the longitudinal direction of the excavator;

wherein said at least one air intake is positioned at a front portion of the excavator bodywork whereas the radiator is located at a rear portion thereof;

wherein an outer, lateral side of said delivery duct is formed by a side bonnet panel of the excavator bodywork; and wherein at least part of said side bonnet panel is pivotable to an open position for exposing the radiator and parallel to said cooling face.

6. Cooling equipment as described in claim 5, wherein said delivery duct comprises:

a first duct portion contiguous to said at least one air intake and having a longitudinal axis which is substantially parallel to said axis of symmetry; and a second duct portion contiguous to said radiator and having a longitudinal axis which is substantially transverse to said axis of symmetry.

7. Cooling equipment as described in claim 6, wherein at least one air intake is located on a forwardly extending box-shaped element, which forms an integral part of the bodywork of the excavator.

8. Cooling equipment described in claim 7, wherein said box-shaped element serves as a battery housing for the excavator.

9. Cooling equipment described in claim 8, further comprising a fuel tank that is housed alongside said radiator, an outer wall of said fuel tank delimiting a part of said delivery duct.

10. Cooling equipment for an excavator having a longitudinal axis of symmetry identifying two directions of preferential movement; said equipment comprising at least one air intake, a duct for delivery of the air to a radiator for cooling of coolant liquids, a fan operable to send a flow of incoming air from said at least one air intake to said radiator, through said delivery duct for providing the desired cooling of the coolant liquid, and a fuel tank housed alongside said radiator;

wherein said at least one air intake is positioned in a way substantially perpendicular to a flow of air drawn in during the forward movement of said excavator, and in that said radiator is position in a manner substantially tangential to said flow of air;

wherein said delivery duct extends substantially in the longitudinal direction of the excavator;

wherein said at least one air intake is position at a front portion of the excavator bodywork whereas the radiator is located at a rear portion thereof;

wherein an outer, lateral side of said delivery duct is formed by a side bonnet panel of the excavator body work; and further wherein at least part of said side bonnet panel is pivotable to an open position for exposing the radiator wherein said delivery duct comprises;

a first duct portion contiguous to said at least one air intake and having a longitudinal axis which is substantially parallel to said axis of symmetry; and a second duct portion contiguous to said radiator and having a longitudinal axis which is substantially transverse to said axis of symmetry wherein at least one air intake is located on a forwardly extending box-shaped element, which forms an integral part of the body work of the excavator wherein said box-shaped element serves as a battery housing for the excavator;

wherein an outer wall of said fuel tank delimiting a part of said delivery duct; and wherein a further air intake is provided in said delivery duct downstream of said at least one air intake; said further air intake being shielded from the air coming from said at least one air intake by a deflector.

* * * * *